(12) United States Patent
Kim

(10) Patent No.: US 8,595,755 B2
(45) Date of Patent: Nov. 26, 2013

(54) GROUND UNIT AND DISK DRIVE HAVING THE SAME

(75) Inventor: Hag-Ryeol Kim, Yongin-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/438,896

(22) Filed: Apr. 4, 2012

(65) Prior Publication Data

US 2012/0260271 A1 Oct. 11, 2012

(30) Foreign Application Priority Data

Apr. 8, 2011 (KR) .......................... 10-2011-0032816

(51) Int. Cl.
*G11B 17/04* (2006.01)
(52) U.S. Cl.
USPC ........................................................ 720/613
(58) Field of Classification Search
USPC ......... 720/613, 657, 601, 603, 610, 607, 611, 720/612, 650, 608
See application file for complete search history.

(56) References Cited

U.S. PATENT DOCUMENTS

| | | | | |
|---|---|---|---|---|
| 7,761,886 B2 * | 7/2010 | Yang et al. | ..................... | 720/613 |
| 7,983,015 B2 * | 7/2011 | Yang et al. | ..................... | 361/220 |
| 8,122,463 B2 * | 2/2012 | Yang et al. | ..................... | 720/650 |
| 8,359,607 B2 * | 1/2013 | Yamauchi et al. | ............ | 720/650 |
| 2007/0252170 A1 * | 11/2007 | Lin et al. | ........................ | 257/173 |
| 2008/0285189 A1 * | 11/2008 | Yang et al. | ...................... | 361/56 |
| 2011/0258650 A1 * | 10/2011 | Yamauchi et al. | ............ | 720/695 |

FOREIGN PATENT DOCUMENTS

| | | |
|---|---|---|
| KR | 10-0281700 B1 | 3/2001 |
| KR | 10-2005-0106309 A | 11/2005 |
| KR | 10-2006-0024730 A | 3/2006 |

OTHER PUBLICATIONS

Korean Office Action mailed Oct. 11, 2012, issued in counterpart Korean Paten Application No. 10-2011-0032816; 3 pages in Korean language.

* cited by examiner

*Primary Examiner* — Allen T Cao
(74) *Attorney, Agent, or Firm* — NSIP Law

(57) ABSTRACT

Provided are a ground unit and a disk drive including the ground unit. The ground unit is disposed on a guide frame which is installed on opposite sides of a main chassis for guiding a guide chassis that is connected to a tray. The ground unit electrically connects the main chassis and the guide frame to each other.

11 Claims, 5 Drawing Sheets

GROUND UNIT AND DISK DRIVE HAVING THE SAME

CROSS-REFERENCE TO RELATED PATENT APPLICATION(S)

This application claims the benefit of Korean Patent Application No. 10-2011-0032816, filed on Apr. 8, 2011, in the Korean Intellectual Property Office, the entire disclosure of which is incorporated herein by reference for all purposes.

BACKGROUND

1. Field

The following description relates to a ground unit and a disk drive including the ground unit.

2. Description of the Related Art

A disk drive is an apparatus for writing and/or reading information to/from an optical recording medium such as a compact disc (CD) or a digital versatile disc (DVD) by irradiating light on the optical recording medium. Typically a disk drive includes a main chassis, a tray on which a disc is mounted and which enters or exits the main chassis, and a cover which makes up an outer appearance of the disk drive and which protects inner structures and electronic devices in the disk drive.

Typically a tray includes a spindle motor for rotating a disc mounted on the tray, an optical pickup unit for reading or writing information from/in the disc, and a pickup conveying unit for reciprocating an optical pickup base, on which the optical pickup unit is mounted, between inner and outer circumferences of the disc. The disk drive may further include a locking unit for maintaining an inserted status of the tray in the main chassis, and a locking release unit for separating the tray from the main chassis. However, static electricity that is generating while using the disk drive may damage precision elements.

SUMMARY

In one general aspect, there is provided a ground unit disposed on a guide frame that is installed on a main chassis of a disk drive, the guide frame configured to guide a sliding movement of a guide chassis that is connected to a tray, wherein the ground unit is configured to electrically connect the guide chassis to the main chassis regardless of insertion/withdrawal of the tray into/from the main chassis.

The ground unit may comprise a supporter protruding from a recess that is formed by penetrating the guide frame, and an elastic body inserted in the supporter and protruding in the recess.

The elastic body may comprise a cylindrical coil spring.

The elastic body may be located between the guide chassis and the main chassis.

The elastic body may protrude toward the guide chassis and the main chassis to contact the guide chassis and the main chassis.

In another aspect, there is provided a disk drive including a main chassis, a tray on which an optical pickup is mounted and which is installed to enter/exit the main chassis, a guide frame installed in the main chassis and configured to guide a guide chassis that is installed on the tray, and a ground unit installed on the guide frame located between the guide chassis and the main chassis, and configured to electrically connect the guide chassis to the main chassis.

The ground unit may comprise a supporter protruding from a recess that is formed by penetrating the guide frame, and an elastic body inserted in the supporter and protruding in the recess.

The elastic body may comprise a cylindrical coil spring.

The elastic body may protrude toward the guide chassis and the main chassis to contact the guide chassis and the main chassis.

The guide frame may be installed on opposite sides of the main chassis, and a ground unit may be installed on each side of the main chassis.

The disk drive may further comprise a stopper configured to stop a protruding edge of the guide chassis, and the ground unit may be located at a position at which the protruding edge of the guide chassis is stopped by the stopper.

Other features and aspects may be apparent from the following detailed description, the drawings, and the claims.

Figure 1:
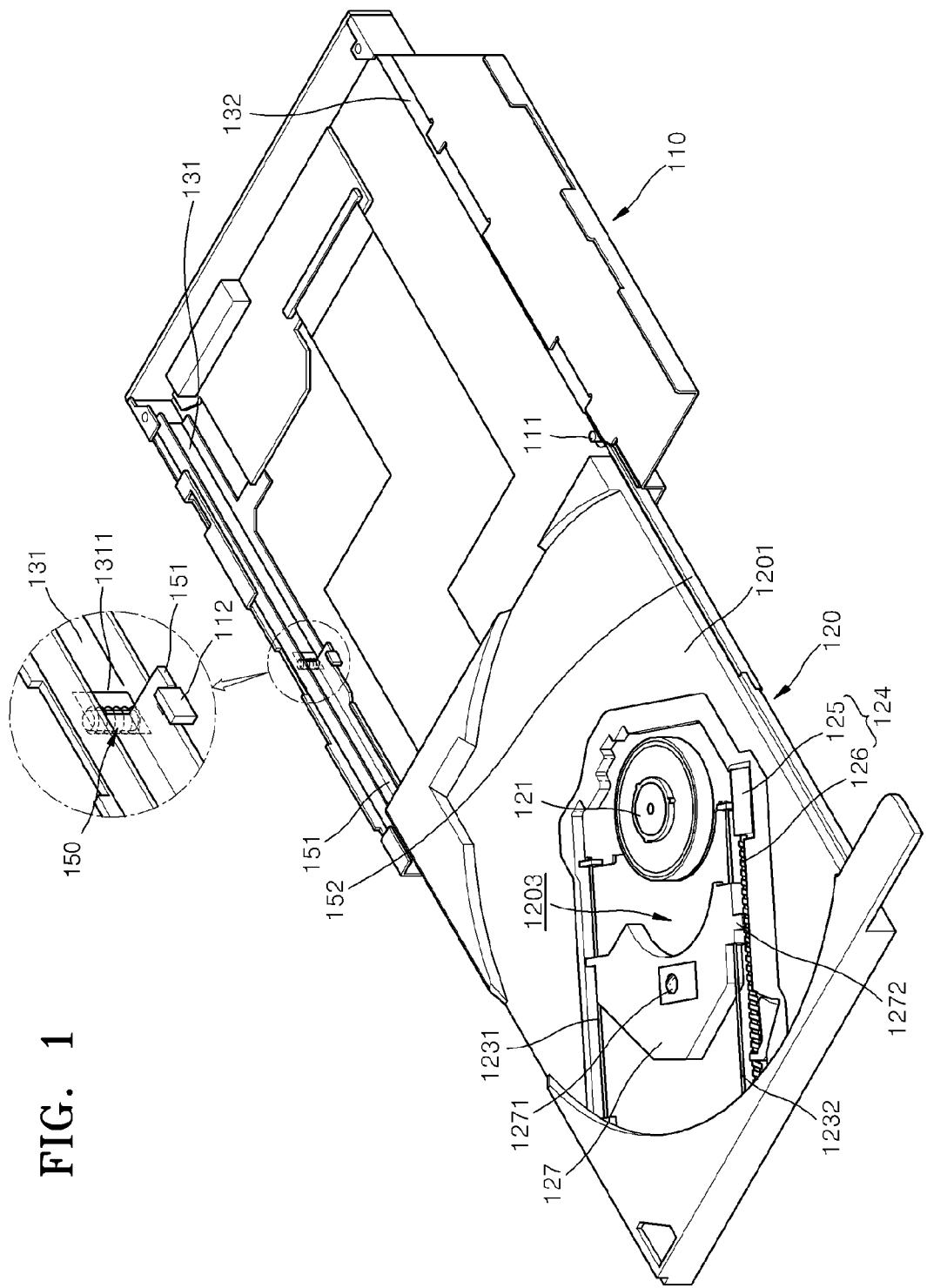
FIG. 1 is a diagram illustrating an example of a disk drive in which a ground unit is mounted.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
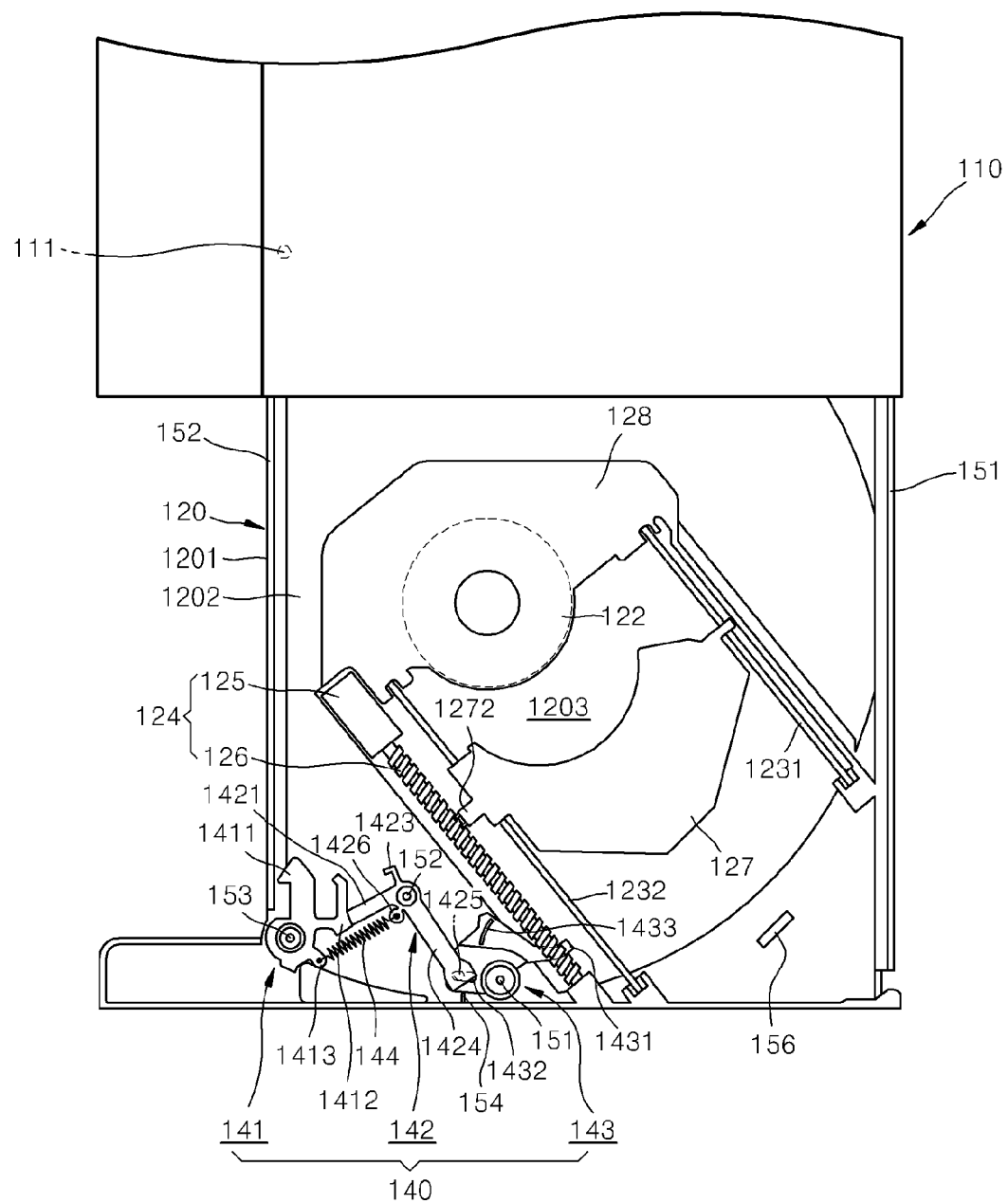
FIG. 2 is a diagram illustrating an example of a rear surface of the disk drive of FIG. 1.
Figure 3:
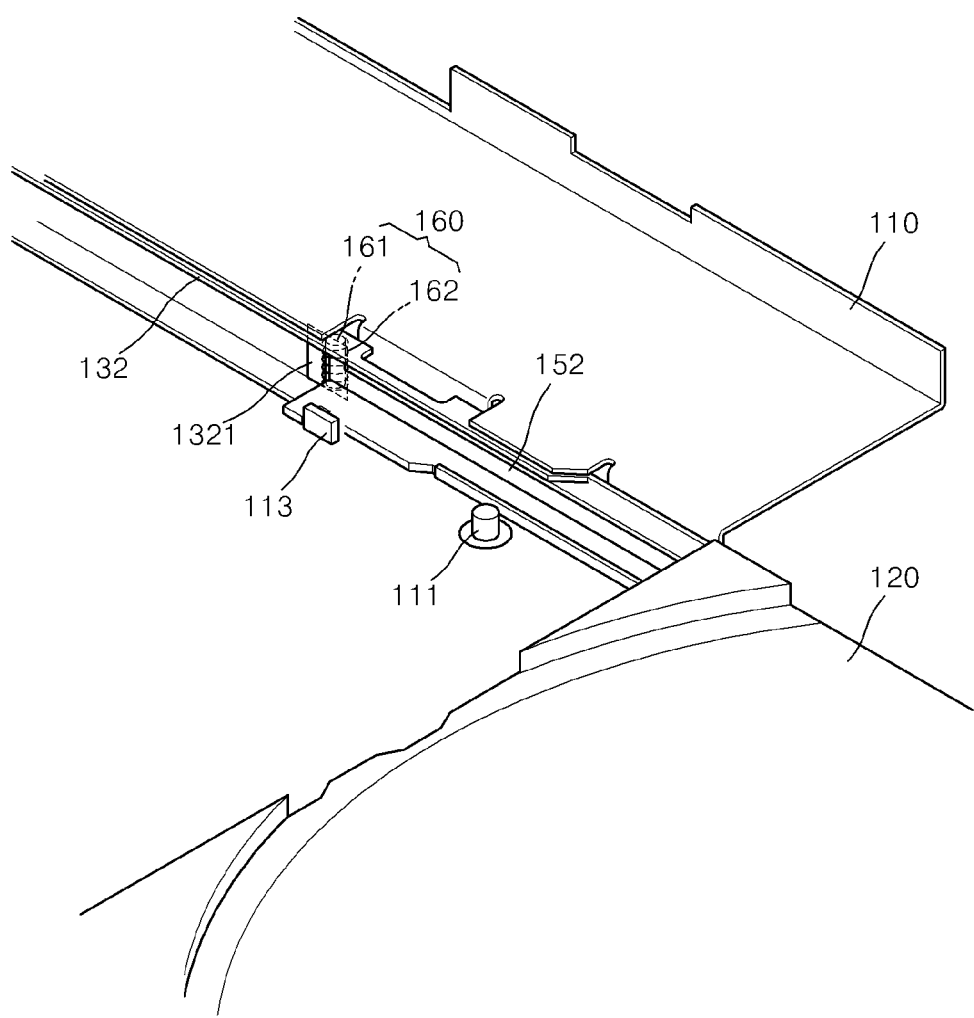
FIG. 3 is a diagram illustrating another example of the disk drive of FIG. 1, in which the ground unit is mounted on another portion of a main chassis.
Figure 4:
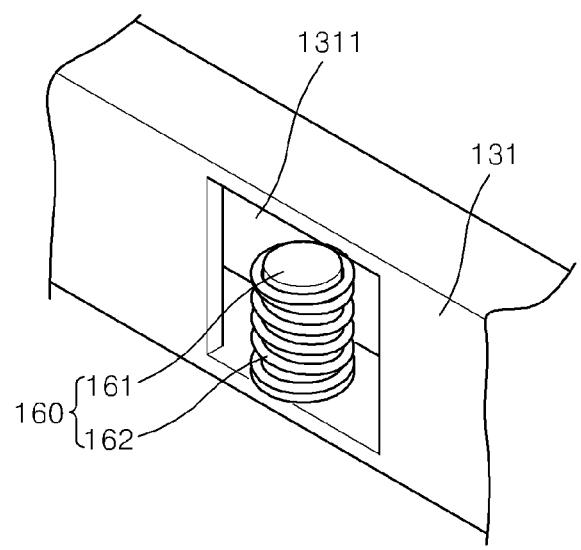
FIG. 4 is a diagram illustrating another example of the ground unit shown in FIG. 1.
Figure 5:
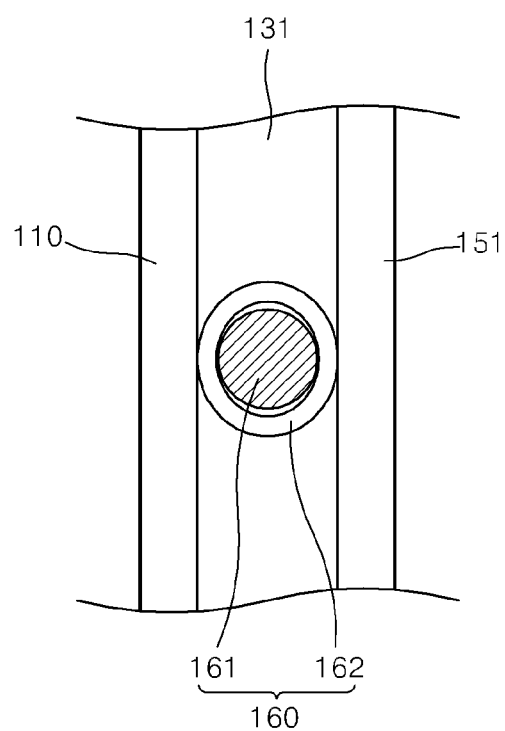
FIG. 5 is a diagram illustrating an example of an installation status of the ground unit shown in FIG. 1.

FIG. 1 illustrates an example of a disk drive 100 in which a ground unit is mounted, FIG. 2 illustrates an example of a rear surface of the disk drive of FIG. 1, and FIG. 3 illustrates an example of a partially perspective view of the disk drive of FIG. 1, in which the ground unit is mounted on another portion of a main chassis. FIG. 4 illustrates an example of a partially cut perspective view of the ground unit shown in FIG. 1, and FIG. 5 illustrates an example of an installation status of the ground unit shown in FIG. 1.

Referring to FIGS. 1 and 2, the disk drive 100 includes a main chassis 110 and a tray 120. A disk (not shown) may be mounted on the tray 120, and the tray 120 may be installed to slide on the main chassis 110.

In this example, the tray 120 includes a turntable 121 on which the disk may be mounted, an optical pickup unit 1271 for writing information to the disk or reading the recorded information from the disk, and guide shafts 1231 and 1232 for guiding linear reciprocating movements of the optical pickup unit 1271. The optical pickup unit 1271 is mounted on a pickup base 127 that is coupled to the guide shafts 1231 and 1232 to reciprocate.

A pickup conveying unit 124 that includes a lead screw 126 for reciprocating the pickup base 127 in a radial direction of the disk and a step motor 125 for rotating the lead screw 126 is mounted on a portion of the tray 120. A feed guide 1272 for transferring a rotating power of the lead screw 126 to the pickup base 127 is disposed on the pickup base 127. A space portion 1203 in which the pickup base 127 linearly reciprocates is formed near a center portion of a body of the tray 120. A motor base 128 (shown in FIG. 2) on which a spindle motor 122 is mounted is located at a side of the space portion 1203. One end of each of the guide shafts 1231 and 1232 is supported by the motor base 128, and the other end is supported by a supporting post 1204 or 1205 which are disposed on the tray 120. For example, the supporting posts 1204 and 1205 may be integrally formed with the tray 120.

Guide chassis 151 and 152 may be formed of metal and are disposed respectively on both side surfaces of the tray 120. In this example, the guide chassis 151 and 152 are slidable. In addition, guide frames 131 and 132 are fixed on both side surfaces of the main chassis 110, and the guide frames 131 and 132 may be formed of a plastic material to guide the guide chassis 151 and 152 to slide while contacting the guide chassis 151 and 152.

Accordingly, if the guide chassis 151 and 152 slide along the guide frames 131 and 132, the tray 120 enters/exists the main chassis 110. The stoppers 112 (refer to FIG. 1) and 113 (refer to FIG. 3) that protrude from a bottom surface of the main chassis 110, face each other and restrict the movement of the guide chassis 151 and 152. Therefore, when a leading edge of each of the guide chassis 151 and 152 contacts the stopper 112 and 113, sliding and escaping of the tray 120 from the main chassis 110 are prevented. For example, if the end portions of the guide chassis 151 and 152 respectively contact the stoppers 112 and 113, the tray 120 is at a maximum withdrawal position from the main chassis 110 as shown in FIG. 1.

Ground units 150 (shown in FIG. 1) and 160 (shown in FIG. 3) are formed on the guide frames 131 and 132, respectively. The ground units 150 and 160 are disposed on the guide frames 131 and 132 as shown in FIGS. 1 and 3 such that they face each other. The ground units 150 and 160 are located at positions at which the leading edges of the guide chassis 151 and 152 are projected by the stoppers 112 and 113 such that the sliding of the tray 120 is stopped. Regardless of whether the guide chassis 151 and 152 slide or not, the guide chassis 151 and 152 and the main chassis 110 may be electrically connected. In FIGS. 1 and 3, the guide chassis 151 and 152 contact center portions of the ground units 150 and 160, however, the present example is not limited thereto provided that the guide chassis 151 and 152 may contact the ground units 150 and 160 in a state of being projected by the stoppers 112 and 113.

As shown in FIGS. 3-5, the ground unit 160 includes a supporter 161 protruding a predetermined height upward (to upper portion of the main chassis 110) in a recess 1311 that is formed by penetrating the guide frame 131, and an elastic body 162 inserted in the supporter 161 such that opposite sides of the elastic body 162 contact the main chassis 110 and the guide chassis 141. For example, the elastic body 162 may be a cylindrical coil spring. Ground unit 150 may include the same features as the ground unit 160.

A side of the guide frame 131 is fixed on the main chassis 110, and the guide chassis 151 is slidably installed on the other side of the guide frame 131. Thus, the guide frame 131 is located between the main chassis 110 and the guide chassis 151. A diameter of the elastic body 162 is slightly greater than a separating distance between the main chassis 110 and the guide chassis 151 and the elastic body 162 has elasticity, and thus, the elastic body 162 may contact the main chassis 110 and the guide chassis 151.

That is, the elastic body 162 is always in a status of contacting the main chassis 110. The guide chassis 151 slides while contacting the elastic body 162 when the tray 120 enters/exists the main chassis 110, and even when the sliding of the guide chassis 151 stops, the guide chassis 151 contacts the elastic body 162.

In addition, as shown in FIG. 3, the ground unit 160 includes the supporter 161 protruding a predetermined height upward (to upper portion of the main chassis 110) in a recess 1321 formed by penetrating the guide frame 132, and the elastic body 162 inserted in the supporter 161 such that opposite sides of the elastic body 162 contact the main chassis 110 and the guide chassis 152. The ground unit 160 may perform the same functions as the ground unit 150, and thus, further descriptions about the ground unit 160 are not provided here.

As shown in FIG. 2, a locking release unit 140 that may be inserted in the main chassis 110 to release a locking state of the tray 120. In this example, the locking release unit 140 includes a lock lever portion 141, a connecting portion 142, and a link portion 143 installed on a rear surface 1202 of the body 1201 of the tray 120. The locking release unit 140 is adjacent to the lead screw 126 to be linked with the lead screw 126 and to release the locking of the tray 120.

The lock lever portion 141 is a portion in which the locking and releasing of the tray 120 are performed. The lock lever portion 141 includes a hole (not shown) to be inserted in a rotary shaft 53 disposed on the rear surface of the body 1201 of the tray 120, a hook portion 1411 coupled to a locking protrusion 111 that protrudes from the main chassis 110, a rotating force receiving portion 1412 contacting the connecting portion 142 to receive the rotating force, and a spring fixing portion 1413 on which a side of a spring 144 is fixed.

The link portion 143 is a portion for transferring the rotating force. The link portion 143 includes a hole (not shown) formed so as to be inserted in a rotary shaft 51 formed on the rear surface of the body 1201 of the tray 120 and rotated, a connecting hole 1432 to which the connecting portion 142 may be connected, a driving force transferring portion 1433 formed of a protrusion of a predetermined height so as to be selectively coupled to the lead screw 126, and an interfering portion 1431 extending a predetermined length from the link portion 143 so as to selectively collide with the feed guide 1272. In this example, the driving force transferring portion 1433 and the interfering portion 1431 are formed to face the lead screw 126.

The connecting portion 142 receives the rotating force from the link portion 143 and rotates, thereby rotating the lock lever portion 141. The connecting portion 142 includes a hole (not shown) formed so as to be inserted in a rotary shaft 52 disposed on the rear surface of the body 1201 of the tray 120, a first connecting portion 1424 including a connecting protrusion 1425 that is inserted in the connecting hole 1432 of the link portion 143, a second connecting portion 1421 connected to the rotating force receiving portion 1412 of the lock lever portion 141, a spring fixing portion 1426 to which the other side of the spring 144 is fixed, and a location determination portion 1423 defining an initial location of the locking release unit 140.

A stopper 154 is adjacent to the link portion 143 so as to define the initial location of the locking release unit 140 which is disposed on the rear surface 1202 of the body 1201 of the tray 120. As shown in FIG. 2, while the tray 120 is protruding from the main chassis 110, the initial location of the locking release unit 140 is at a state in which the locking of the tray 120 to the main chassis 110 is released. The link portion 143 contacts the stopper 154, and the location determination portion 1423 of the connecting portion 142 contacts the frame 155 of the tray 120. Therefore, the initial location of the locking release unit 140 may be defined by the stopper 154 and the location determination unit 1423.

A pickup base location determination portion 156 for defining a location of the pickup base 127 is disposed on the rear surface of the body 1201 of the tray 120. For example, the maximum movement of the pickup base 127 in an outer circumferential direction of the disc may be defined by the pickup base location definition portion 156.

The spring 144 applies an elastic force to the lock lever portion 141 in a coupling direction of the hook portion 1411 to the locking protrusion 111.

The ground unit and the disk drive including the ground unit of the present invention, may reduce the number of manufacturing processes and manufacturing costs due to the simple structure of the ground unit, and the main chassis and the guide chassis may be efficiently grounded.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A ground unit, comprising:
a supporter; and
an elastic body, wherein
the ground unit is disposed on a guide frame that is configured to be installed on a main chassis of a disk drive and to guide a sliding movement of a guide chassis that is connected to a tray; and
the ground unit is configured to electrically connect the guide chassis to the main chassis.

2. The ground unit of claim 1, wherein the supporter protrudes from a recess that is formed by penetrating the guide frame; and the elastic body is inserted in the supporter and protruding in the recess.

3. The ground unit of claim 2, wherein the elastic body comprises a cylindrical coil spring.

4. The ground unit of claim 2, wherein the elastic body is located between the guide chassis and the main chassis.

5. The ground unit of claim 4, wherein the elastic body protrudes toward the guide chassis and the main chassis to contact the guide chassis and the main chassis.

6. A disk drive comprising:
a main chassis;
a tray on which an optical pickup is mounted and which is installed to enter/exit the main chassis;
a guide frame installed in the main chassis and configured to guide a guide chassis that is installed on the tray; and
a ground unit, comprising a supporter and an elastic body, that is installed on the guide frame located between the guide chassis and the main chassis, and configured to electrically connect the guide chassis to the main chassis.

7. The disk drive of claim 6, wherein the supporter protrudes from a recess that is formed by penetrating the guide frame; and the elastic body is inserted in the supporter and protruding in the recess.

8. The disk drive of claim 7, wherein the elastic body comprises a cylindrical coil spring.

9. The disk drive of claim 8, wherein the elastic body protrudes toward the guide chassis and the main chassis to contact the guide chassis and the main chassis.

10. The disk drive of claim 6, wherein the guide frame is installed on opposite sides of the main chassis, and a ground unit is installed on each side of the main chassis.

11. The disk drive of claim 6, further comprising a stopper configured to stop a protruding edge of the guide chassis, wherein the ground unit is located at a position at which the protruding edge of the guide chassis is stopped by the stopper.

* * * * *